Feb. 18, 1941.  W. V. SMITH  2,232,488

METHOD OF MAKING TIRE TREADS

Original Filed Dec. 1, 1937

INVENTOR
WALTER V. SMITH
BY Chapin & Neal
ATTORNEYS

Patented Feb. 18, 1941

2,232,488

UNITED STATES PATENT OFFICE 2,232,488

METHOD OF MAKING TIRE TREADS

Walter V. Smith, South Hadley Falls, Mass., assignor, by mesne assignments, to United States Rubber Company, New York, N. Y., a corporation of New Jersey Original application December 1, 1937, Serial No. 177,646. Divided and this application July 15, 1939, Serial No. 284,780

12 Claims. (Cl. 154—14)

This invention relates to the manufacture of pneumatic or other tires. the tread portion of which is formed of a rubber compound, and more particularly to the construction of such tread portions.

The principal object of the present invention is the provision of a method of providing a tire tread, formed of suitable tread stock, with inserts of a different material such as a gum stock.

One form of mechanism for carrying out the method of this invention is shown in my copending application Serial No. 177,646, filed December 1, 1937, of which application the present is a division.

In the accompanying drawing certain instrumentalities of the machine illustratively disclosed in said copending application are shown for the purpose of illustrating one manner of carrying out my method, but it will be understood that such showing is illustrative only and the method may be carried out by various instrumentalities and is not limited to any particular mechanism.

Figure 3:
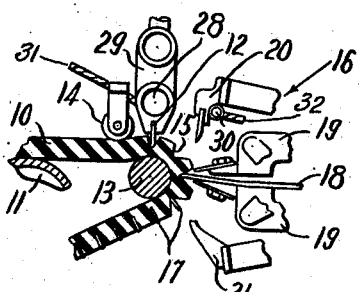
Figure 4:
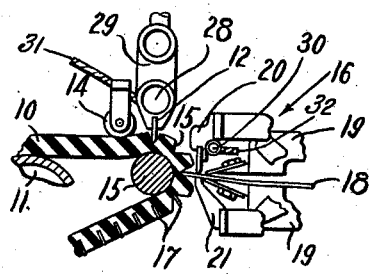
Figure 5:
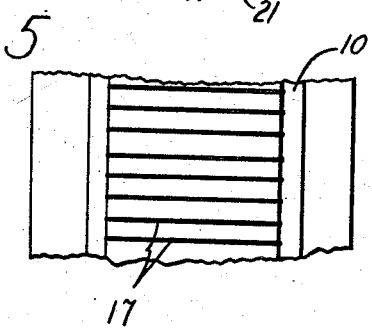

In the accompanying drawing, Figs. 1 to 4 inclusive show successive steps of the method, the tread being shown in section, and Fig. 5 is a plan view of a fragment of the completed tread strip as prepared for application to a tire carcass preparatory to vulcanization.

Figure 1:
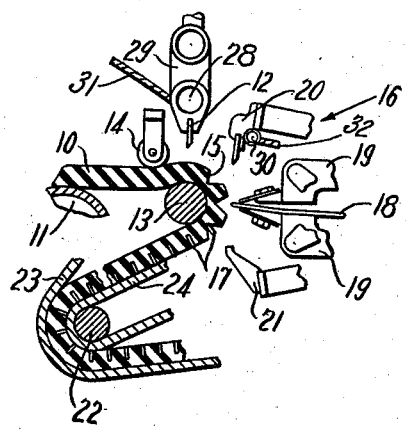

The drawing shows the method as applied to the edgewise insertion of a succession of strips of gum transversely of the tread. In Fig. 1 a length of tread stock 10 is fed over a conveyer roll 11, beneath a knife 12 and sharply around a roll 13. The roll 13 is of relatively small diameter to impose tension on the outer surface of the strip. A small roll 14 is arranged rearwardly of the knife to bend the stock slightly downwardly against the rear face of the roll 13 to assure tension in the portion of the tread strip beneath the knife 12.

Figure 2:
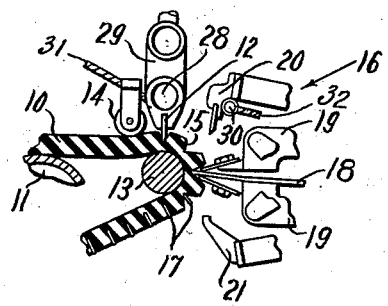

Downward movement of the knife forms a transverse cut 15 in the tread, which as shown in Fig. 2 opens progressively as the cut is made because of the tension in the rubber being cut. After each cut is made the tread strip is advanced to present the still open cut in front of an inserting means generally indicated at 16.

The inserts 17 are formed from a strip of gum rubber 18, the forward end of which is held between grippers 19 which form part of the inserting means. After the first two cuts are made the knife and inserter function simultaneously. Fig. 1 shows the start of a complete cycle of operation. The knife 12 and grippers 19 are retracted from the tread, the grippers being in line with a cut made at a preceding cutting operation and held open by the tensioning of the rubber.

In Fig. 2 the knife is lowered to form a cut in the tread and simultaneously the grippers 19 have advanced into the open cut carrying the strip 18 with it and forcing the free end of the strip into adhering contact with the bottom of the adjacent cut. The grippers are then opened, as shown in Fig. 3, and moved rearwardly along the strip, the end of which is now stuck to the bottom of the cut, a distance slightly greater than the depth of the cut. The grippers are then closed to again grip the strip as shown in Fig. 4. As also shown in the latter figure, a cutting mechanism, comprising a blade 20 and cooperating platen 21, is advanced from opposite sides of the strip to sever the insert 17 from the strip. The severance is made slightly in advance of the grippers to leave the end of the strip protruding slightly from the grippers to facilitate sticking the end of the strip to the bottom of the next cut at the next cycle of operation, the amount severed being substantially equal to the depth of the cut in the tread. During the release and rearward movement of the grippers, their re-gripping movement and the actuation of the cutters 20, 21, the knife 12 has been completing its cutting action. Knife 12 and cutting members 20 and 21 are now returned to the position of Fig. 1 and the tread strip advanced to present an unfilled cut to the grippers as shown in that figure. With the advance of the tread strip from roll 13 the tension on the tread is released and the inserts are gripped between the walls of the cut. Preferably the tread strip is bent in a reverse direction around a roll 22 as shown in Fig. 1, to compress the filled portion of the tread and thereby insure firm adhesion of the walls of the cut to the side faces of the inserts. As shown in Fig. 1, the tread strip is guided around roll 22 between belts 23 and 24.

Preferably the walls of the tread cuts and the free end of strip 18 are treated to increase their tackiness. It is well known that freshly cut unvulcanized rubber surfaces, and particularly where the cutting has been done with a heated knife, are more readily bonded together than where the cuts are not fresh or are made with a cold knife. For this reason I prefer that the knives for cutting the tread and gum stocks shall be heated. Knife 12 is shown as heated by an electric heating element 28 positioned in the tread 29 which carries knife 12. An electrical heating element 30 is similarly employed to heat the knife 29. Elements 28 and 30 are supplied with electric current through suitable conductors, such as cables 31 and 32, respectively.

I have also found it to be desirable that the tread which is relatively massive shall be warm at the time the insert-receiving cuts are made, that is approximating the temperature imparted to it by the calender or tuber by which the tread is shaped into strip form. The tread stock when warm is less resilient than after it is cold and offers less resistance to the penetration of the knife. I have further found that it is advantageous to form the cut in the tread slowly— that is, to let the heated knife "sink" into the tread. The advance of the knife is not so slow as to burn or bake the rubber, but is such that the resilience of the rubber is temporarily destroyed as the knife advances. Such procedure makes possible much more accuracy in the depth of the cut, requires less power, and leaves the walls of the cut in better condition for satisfactory bonding with the inserted material. The insert can be placed immediately in the cut as, or as soon as, the knife is withdrawn, but slight delay in the insertion of the gum strip, such as that allowed by advancing the tread one or two cuts before inserting the gum stock is permissible. this delay in the insertion of the gum stock also makes it possible to perform the inserting operation while the knife is engaged in the tread strip, the knife thus assisting in holding the tread strip stationary during the inserting operation and further assuring the accuracy of the positioning of the cuts with reference to the inserting mechanism.

I claim:

1. The method of providing an unvulcanized rubber tire tread with inserts in the form of thin layers of materal positioned edgewise in the tread which comprises forming a cut in the unvulcanized tread, bending the tread to place the cut portion under tension and cause the walls of the cut to be held separated, attaching the free end of a thin strip of material to the tread rubber within the cut, supporting the strip at a point spaced from the attached end, severing the strip intermediate the attached end and said point of support to leave the severed portion between the walls of the cut and releasing the tread from the cut opening tension.

2. The method of providing an unvulcanized rubber tire tread with inserts in the form of thin layers of material positioned edgewise in the tread which comprises forming a cut in the unvulcanized tread, bending the tread to place the cut portion under tension and cause the walls of the cut to be held separated, attaching the free end of a thin strip of material to the bottom portion of the cut, supporting the strip at a point outwardly of the cut to hold the unattached portion of the strip within the cut spaced from the walls of the cut, severing the strip intermediate the attached end and said point of support and releasing the tread from tension to permit the walls of the cut to engage the severed portion of the strip.

3. The method of providing an unvulcanized rubber tire tread with inserts in the form of thin layers of material positioned edgewise in the tread which comprises forming a cut in the unvulcanized tread, bending the tread to place the cut portion under tension and cause the walls of the cut to be held separated, forcing the end of a thin strip of material into adhering contact with the bottom portion of the cut, severing from the strip the portion of the latter lying within the cut, and releasing the tread from tension to permit the walls of the cut to close on the severed portion of the strip.

4. The method of providing an unvulcanized rubber tire tread with inserts in the form of thin layers of material positioned edgewise in the tread which comprises forming a cut in the unvulcanized tread, bending the tread to place the cut portion under tension and cause the walls of the cut to be held separated, forcing the end of a thin strip of material into adhering contact with the bottom portion of the cut, severing from the strip the portion of the latter lying within the cut, and releasing the tread from tension to permit the walls of the cut to close on the severed portion of the strip, and reversing the curvature of the tread to force the walls of the cut into firm engagement with the severed portion of the strip.

5. The method of providing an unvulcanized rubber tire tread with inserts in the form of thin layers of material positioned edgewise in the tread which comprises forming a cut in the unvulcanized tread, bending the tread to place the cut portion under tension and cause the walls of the cut to be held separated, forcing the end of a thin strip of material into adhering contact with the bottom portion of the cut, severing from the strip the portion of the latter lying within the cut, and releasing the tread from tension to permit the walls of the cut to close on the severed portion of the strip, thereafter forcing the walls of the cut toward each other to increase their adhesion to the severed portion of the strip.

6. The method of providing an unvulcanized rubber tire tread with inserts in the form of thin layers of material positioned edgewise in the tread which comprises bending the tread to place the outer portion of the tread under tension, forcing a heated cutting member into the so tensioned tread with sufficient slowness to permit the heat of the knife to temporarily destroy the elasticity of the tread rubber and increase its adhesive properties, withdrawing the cutting member while maintaining the tension in the tread to hold the cut open, forcing the end of a thin strip of material into adhering contact with the bottom portion of the cut, severing from the strip the portion of the latter lying within the cut, and releasing the tread from tension to permit the walls of the cut to close on the severed portion of the strip.

7. The method of providing an unvulcanized rubber tire tread with inserts in the form of thin layers of material positioned edgewise in the tread which comprises bending the tread to place the outer portion of the tread under tension, forcing a heated cutting member into the so tensioned tread with sufficient slowness to permit the heat of the knife to increase the tackiness of the walls of the cut while permitting the tension imposed on the tread to draw the walls out of contact with the cutting member as the latter advances, withdrawing the cutting member while maintaining the tension in the tread to hold the cut open, forcing the end of a thin strip of material into adhering contact with the bottom portion of the cut, severing from the strip the portion of the latter lying within the cut, and releasing the tread from tension to permit the walls of the cut to close on the severed portion of the strip.

8. The method of inserting thin layers of material edgewise in cuts formed in a body of unvulcanized rubber which comprises attaching the free end of a thin strip of material to the rubber within the cut, supporting the strip at a point spaced from the attached end, and severing the strip intermediate the attached end and said point of support.

9. The method of inserting thin layers of material edgewise in cuts formed in a body of unvulcanized rubber which comprises attaching the free end of a thin strip of material to the bottom portion of the cut, supporting the strip at a point outwardly of the cut, and severing from the strip that portion of the strip lying within the cut.

10. The method of inserting thin layers of material edgewise in cuts formed in a rubber tire tread which comprises attaching the free end of a thin strip of material to the tread rubber within the cut, supporting the strip at a point spaced from the attached end, and severing the strip intermediate the attached end and said point of support.

11. The method of inserting thin layers of material edgewise in cuts formed in a rubber tire tread which comprises, attaching the free end of a thin strip of material to the bottom portion of the cut, supporting the strip at a point outwardly of the cut, and severing from the strip that portion of the strip lying within the cut.

12. The method of providing a tread strip with ribbon-like inserts of a filler material which comprises bending the tread strip to place its outer portion under tension, forcing a heated cutting edge into the so tensioned portion to form cuts, the walls of which are held separated by said tension, advancing the end of a strip of filler material into the cuts and pressing it into adhering contact with the bottom of the cut, severing the end portion of the filler strip to leave said portion in the cut with its severed edge substantially flush with the surface of the tread and finally releasing the tread strip from tension to permit the walls of the cut to engage and grip the severed portion of the filler strip within the cut.

WALTER V. SMITH.